United States Patent [19]

Umemoto

[11] Patent Number: 5,046,081
[45] Date of Patent: Sep. 3, 1991

[54] RADIO TELEPHONE WITH VARIABLE ATTENUATOR FOR CONTROLLING MODULATED SIGNAL

[75] Inventor: Yuji Umemoto, Hachioji, Japan
[73] Assignee: Kabushiki Kaisha Toshiba, Kawasaki, Japan
[21] Appl. No.: 492,927
[22] Filed: Mar. 13, 1990

[30] Foreign Application Priority Data

Mar. 15, 1989 [JP] Japan .................................. 1-62619

[51] Int. Cl.⁵ .......................................... H04M 11/00
[52] U.S. Cl. ....................................... 379/58; 379/63; 455/116
[58] Field of Search ....................... 379/58, 59, 61, 63; 455/69, 116

[56] References Cited

U.S. PATENT DOCUMENTS

| | | | |
|---|---|---|---|
| 4,232,392 | 11/1980 | French ................................. | 455/116 |
| 4,392,245 | 7/1983 | Mitama ................................ | 455/69 |
| 4,629,829 | 12/1986 | Pohl et al. ........................... | 379/58 |
| 4,727,568 | 2/1988 | Morishima ........................... | 379/63 |
| 4,731,866 | 3/1988 | Moratani et al. .................... | 455/69 |

Primary Examiner—Jin F. Ng
Assistant Examiner—Dwayne D. Bost
Attorney, Agent, or Firm—Finnegan, Henderson, Farabow, Garrett and Dunner

[57] ABSTRACT

A variable attenuating circuit is provided between a control circuit of a radio telephone and a transmitter to control the level of the control signal to either terminate or hold the speech when either the speech terminating or the holding operation is performed. When the control signal for either speech termination or speech holding is transmitted from the radio telephone to a base unit, the degree of attenuation by the attenuating circuit is controlled so as to be reduced. Thus, the level of the control signal in the transmitter is controlled to thereby reduce the level of the control signal leaking possibly to the cable telephone line. When the base unit cannot receive the control signal to either terminate or hold the speech, it restores the original degree of attenuation of the attenuating circuit and again sends the control signal to either terminate or hold the speech.

17 Claims, 8 Drawing Sheets

RADIO TELEPHONE WITH VARIABLE ATTENUATOR FOR CONTROLLING MODULATED SIGNAL

BACKGROUND OF THE INVENTION

1. Field of the Invention

The present invention relates to multi-channel access type radio telephone devices which include a base unit connected to a cable telephone line and a radio telephone connected via a radio circuit line with the base unit, wherein an idle one of a plurality of radio channels provided between the base unit and the radio telephone is detected to transmit/receive voice and control signals, etc., and methods of controlling the radio telephone devices, and more particularly to such devices which reduce the level of the control signal leaking possibly to the cable telephone line, especially in the speech holding and terminating operation, etc.

2. Description of the Related Art

FIG. 1 is a block diagram of the structure of a conventional radio telephone device of this type. In FIG. 1, a base unit 1 is connected via a radio circuit line with a radio telephone 2 and also with a cable telephone line 3.

The incoming signal from the cable telephone line 3 is delivered as a modulating input to a transmitter 7 via a line switch 4, a hybrid circuit 5 and a transmission voice switch 6. The electric waves modulated by the transmitter 7 are radiated toward the radio telephone 2 from a transmission antenna 8. The transmitted electric waves from the radio telephone 2 are received by a reception antenna 9 and demodulated by a receiver 10. The demodulated signal is delivered to the cable telephone line 3 via a voice switch 11, the hybrid circuit 5 and the line switch 4.

A synthesizer 12 outputs a signal of a frequency, corresponding to a radio channel (a speech channel and a control channel), to the transmitter 7 and receiver 10.

One of the demodulated outputs from the receiver 10 is input to a reception electric field detector 13 and used for detection of the field strength. The detector circuit 13 may be constituted by a carrier squelch circuit or a noise squelch circuit. Another demodulated output from the receiver 10 is output as a data signal contained in the received demodulated waves and input to an identification signal detector 14 which checks an identification signal (ID code) determined by a combination of the base unit 1 and radio telephone 2.

The output from the field detector 13 and identification signal detector 14 and the demodulated data signal output are input to a control circuit 16 for use in connection control. The control circuit 16 controls the synthesizer 12 to control the switching of radio channels and sends the transmission data signal as an modulating input to the transmitter 7, etc. The holding circuit 15 sends a melody sound to the cable telephone line 3 when the holding operation (by a holding button 29a of a key pad unit 29) is performed at the radio telephone 2.

Similarly, the radio telephone 2 includes a reception antenna 18 and a receiver 19 the demodulated output of which is delivered to an earpiece 20. Voice to a mouthpiece 21 acts as a modulating input to the transmitter 22 the output of which is radiated from a transmission antenna 23.

A synthesizer 34, a reception electric field detector 24 and an identification signal detector 25 are similar to those in the base unit 1. A control circuit 27 controls the radio telephone 2. A hook-switch 28 is operated when a call is placed, when a speech is terminated and when the output signal from the switch 28 is input to the control circuit 27. A dial key pad unit 29 is for a dialing operation and line holding purposes and the output signal from the key pad unit is input to the control circuit 27. A speaker 30 is a sounder which generates a ringing tone when there is an incoming call. In the base unit, a power supply for these elements is obtained from a rectifying and stabilizing circuit 32 via an AC plug 31 connected to an AC 100 volt source. The radio telephone 2 uses as a power supply the output of a rechargeable battery 33.

The control of this conventional radio telephone device is provided as follows when there is an incoming call.

When the base unit 1 in a standby state detects a call signal from the cable telephone line 3, it sets the oscillating frequency of the synthesizer 12 at a control channel frequency, and turns on the transmitter 7 to cause same to transmit an incoming signal. The incoming signal includes a signal to designate a speech channel S-CH.

The radio telephone 2 turns on the synthesizer 34 for a predetermined time when it is in a standby state, sets its oscillating frequency at the control channel frequency and turns on the receiver 19. When the incoming signal is received at this time, the radio telephone 2 turns on the transmitter 22 to cause same to transmit an acknowledgement signal including an ID code allocated to the telephone 2 and selects a speech channel S-CH designated by the base unit 1.

When the base unit 1 detects the electric waves from the radio telephone 2 using the reception field detector 13, it stops the transmission of the incoming signal. When it confirms the ID code contained in the acknowledge signal, it selects a channel S-CH designated by the incoming signal. If not, the base unit 1 awaits until the calling from the cable telephone line 3 disappears because there may be a response from another radio telephone set, and then returns to its standby state.

After the base unit 1 selects the channel S-CH, it sends a bell ringing signal. When the radio telephone 2 receives it, it sends a ringing tone from the sounder 30. When the hook switch 28 goes off-hook by its on operation in response to the ringing tone, the radio telephone 2 sends an off-hook signal to thereby establish speech communication.

When the base unit 1 receives the off-hook signal, it stops the transmission of the bell ringing signal and closes the line switch 4 to establish a speech loop with the cable telephone line 3 for speech purposes.

The operation of the radio telephone set 2 performed when the telephone 2 places a call is as follows. When the hook-switch 28 is turned on for placing a call to the cable telephone line 3, the control circuit 27 determines that it should shift to the calling operation because the switch 28 is turned on, locks the oscillating frequency of the synthesizer 34 at the control channel, turns on the receiver 19 to cause same to receive electric waves at the control channel C-CH. The reception field detector 24 detects the field strength of the received electric waves in the control channel. If the detected field strength does not exceed a predetermined reception field strength, the radio telephone 2 determines that the control channel is idle and turns on the transmitter 22 to cause same to transmit a call signal including the ID code allocated to the telephone 2. The base unit 1 monitors the presence of the received electric waves in the control channel. When the base unit 1 receives the call signal from the radio telephone 2, it determines whether the ID code contained in the call signal coincides with the ID code allocated to the combination of the radio telephone 2 and the base unit. If so, it turns on the transmitter 7 to cause same to transmit a call responsive signal (including the ID code and information on the designation of a S-CH) to the radio telephone 2.

The radio telephone 2 receives the call responsive signal from the base unit 1 via the control channel and checks whether the ID code contained in the call responsive signal coincides with that of the radio telephone 2. If so, it switches the oscillating frequency of the synthesizer 34 to that of the speech channel designated by the base unit 1. After the base unit 1 has transmitted the call responsive signal, it switches the oscillating frequency of the synthesizer 12 to the frequency of the speech channel designated for speech purposes.

Thus, the base unit 1 and radio telephone 2 are connected by the speech channel designated by the base unit 1. By a subsequent dialing operation through the dial key pad unit 29, the telephone connected to the cable telephone line 3 is called and placed into telephonic communication.

If the telephonic communication ends and the hook switch 28 goes on-hook thereafter, the control circuit 27 inputs a speech terminating signal as a shut off command to the transmitter 22 to cause same to radiate the terminating signal from the transmission antenna 23 in order to interrupt the connection of the radio telephone 2 with the cable telephone line 3.

When the control unit 16 of the base unit 1 receives the terminating signal via the receiver 10, it first turns off the voice switch 11 to interrupt the voice path between the receiver 10 and the hybrid circuit 5. If the ID code contained in the terminating signal coincides with a predetermined allocated one, and the control command is a "speech terminating" command, the control circuit 16 turns off the line switch 4 to interrupt the connection with the cable telephone line 3.

The terminating signal transmitted by the radio telephone 2 is a data signal of a predetermined bit length and constituted by a bit synchronizing signal 41, a frame synchronizing signal 42, an ID code signal 43 and a speech terminating command signal 44, as shown in FIG. 2(a). When the bit synchronizing signal 41 and the frame synchronizing signal 42 are successively detected, the control circuit 16 of the base unit 1 turns off the voice switch 11 as shown in FIG. 2(b). Subsequently, when the ID code signal 43 coincides with that allocated to the base unit and the control command is the speech terminating command signal 44, the base unit turns off the line switch 4 as shown in FIG. 2(c). Thereafter, the base unit 1 transmits a speech termination responsive signal to the radio telephone 2 to thereby return the radio telephone 2 to its standby state.

As will be obvious from the timing chart of FIG. 2, the control circuit 16 of the base unit 1 turns off the voice switch 11 when the frame synchronizing signal 42 is detected in the speech termination. Therefore, the bit and frame synchronizing signals 41 and 42 are delivered to the cable telephone line 3 as shown in FIG. 2(d) during the time interval t from the transmission of the bit synchronizing signal 41 to the turning off of the switch 11. Thus, the control signal unrelated to the communication voice would leak to the cable telephone line 3, which does not become a big problem if the signal level of the bit synchronizing signal 41, etc., is low. However, since the level of control signals such as the speech terminating signal is rendered high to ensure a sufficient S/N ratio and hence sufficient reliability even if the radio telephone 2 is positioned close to the bound of the service area in the past, the level of the control signal leaking possibly to the cable telephone line 3 is considerably high. Therefore, this would act as an uncomfortable sound disadvantageously to the caller on the cable telephone line.

A similar phenomenon would also occur during the time interval from the turning off of the voice switch 11 by the holding operation to the generation of a melody sound indicative of the hold state to thereby give an uncomfortable feeling to the addressee.

Since the addressee continues to hold the handset in telephonic communication during the holding operation, the uncomfortable sound greatly influences the addressee.

SUMMARY OF THE INVENTION

It is an object of the present invention to provide a radio telephone device which reduces the level of a control signal leaking possibly to the cable telephone line to thereby give no uncomfortable feeling to the addressee and a method of controlling same.

It is another object of the present invention to provide a radio telephone device which reduces the level of a control signal leaking possibly to the cable telephone line and which ensures a speech terminating or holding operation and a method of controlling the telephone device.

The invention is characterized by variable signal level control means provided in the radio telephone device for changing the signal level of the control signal sent via a radio circuit in accordance with predetermined conditions.

According to the present invention, the signal level of the control signal for speech termination or holding is controlled so as to be reduced as when the speech terminating or holding operation is performed. Thus, the level of the control signal leaking possibly to the cable telephone line is reduced and a direct uncomfortable feeling to the addressee is eliminated.

According to the present invention, the signal level of the control signal for speech termination or holding is controlled so as to reduced as when the speech termination or holding operation is performed. If the control signal is not received by the base unit, the original signal level of the control signal is restored and the resulting signal is sent. Thus, the level of the control signal leaking possibly to the cable telephone line is reduced and the speech terminating or holding operation is ensured.

DESCRIPTION OF THE PREFERRED EMBODIMENTS

Figure 1:
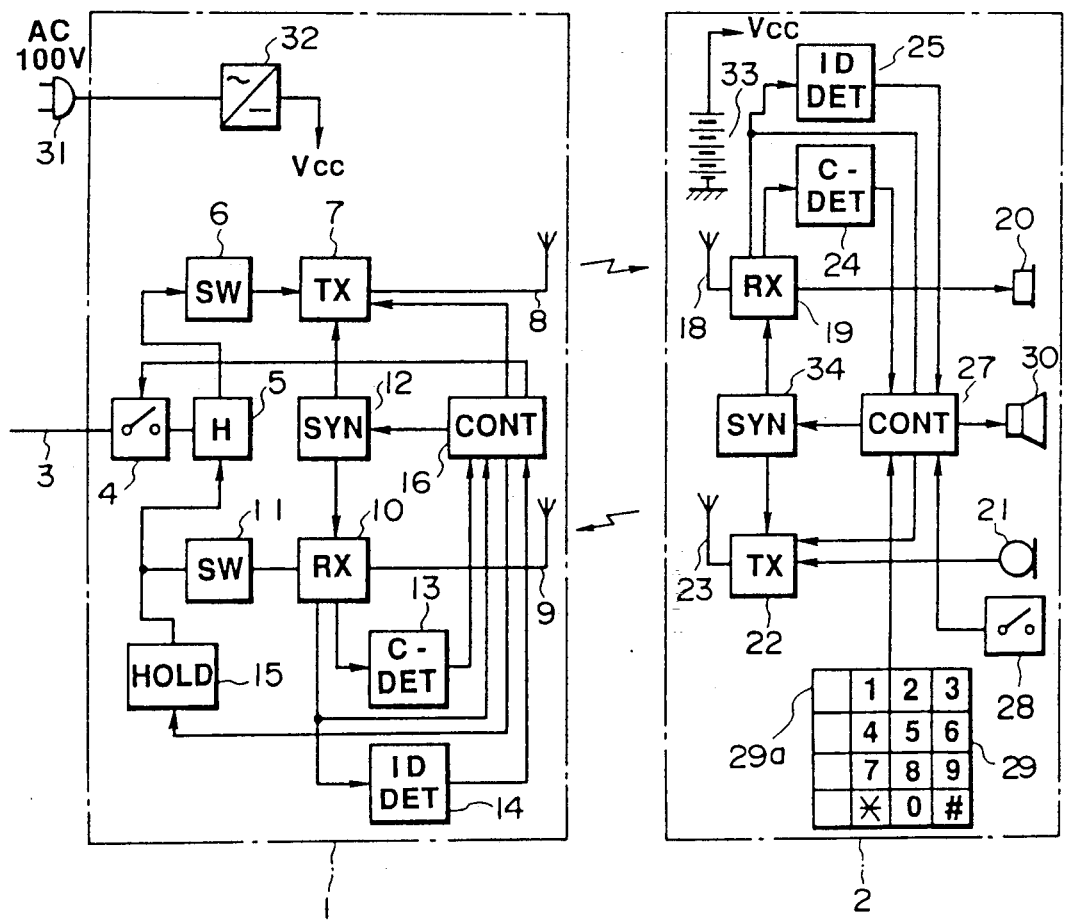
FIG. 1 is a block diagram of a conventional radio telephone device.
Figure 3:
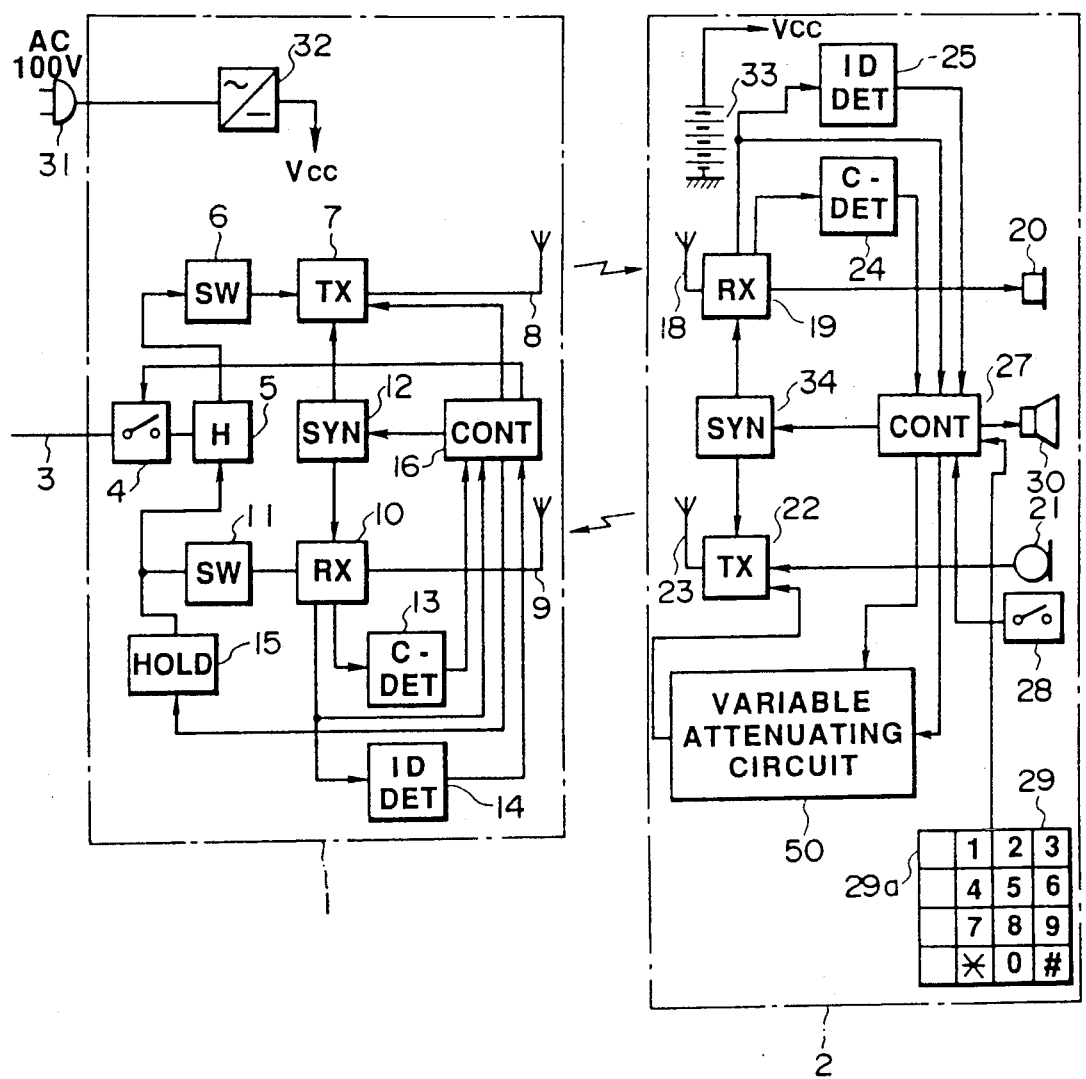
FIG. 3 is a block diagram illustrating one embodiment of the present invention.

FIG. 3 is a block diagram illustrating one embodiment of the present invention. In FIG. 3, a variable attenuating circuit 50 is provided between a control circuit 27 and a transmitter 22. It variably controls the level of a control signal such as a speech terminating signal or a holding signal sent from the control circuit 27 to the transmitter 22 to thereby variably control the level of the control signal sent from the radio telephone set 2 to the base unit 1. The remaining structure portions of the radio telephone device are similar to the corresponding ones of the device of FIG. 1. For a convenience of explanation, like reference numerals are used to denote elements having similar functions in FIGS. 1 and 3.

Figure 4:
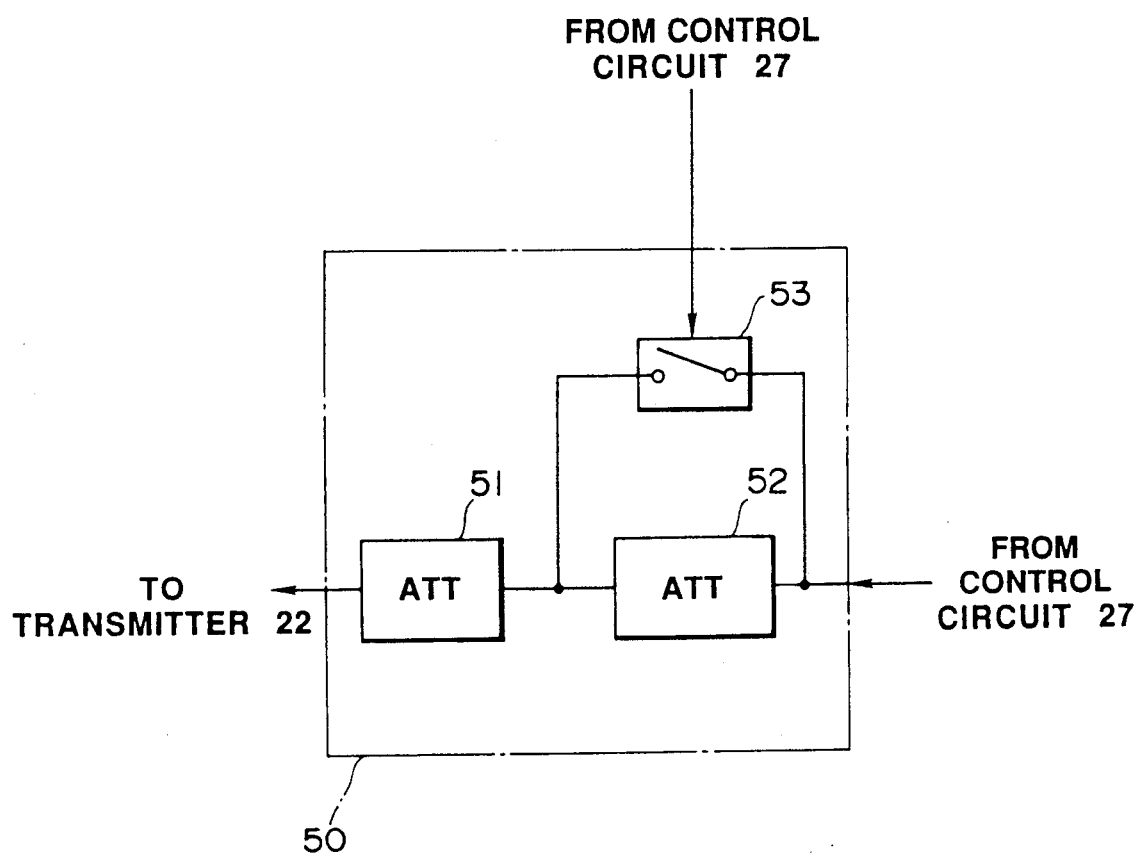
FIG. 4 is a block diagram illustrating one structure of a variable attenuator in the embodiment of FIG. 3.

FIG. 4 shows an illustrative structure of a variable attenuating circuit 50 which includes two attenuators 51 and 52 connected in series, and a switch 53 which shorts the input-side attenuator 52 in accordance with a command from the control unit 27.

Figure 5:
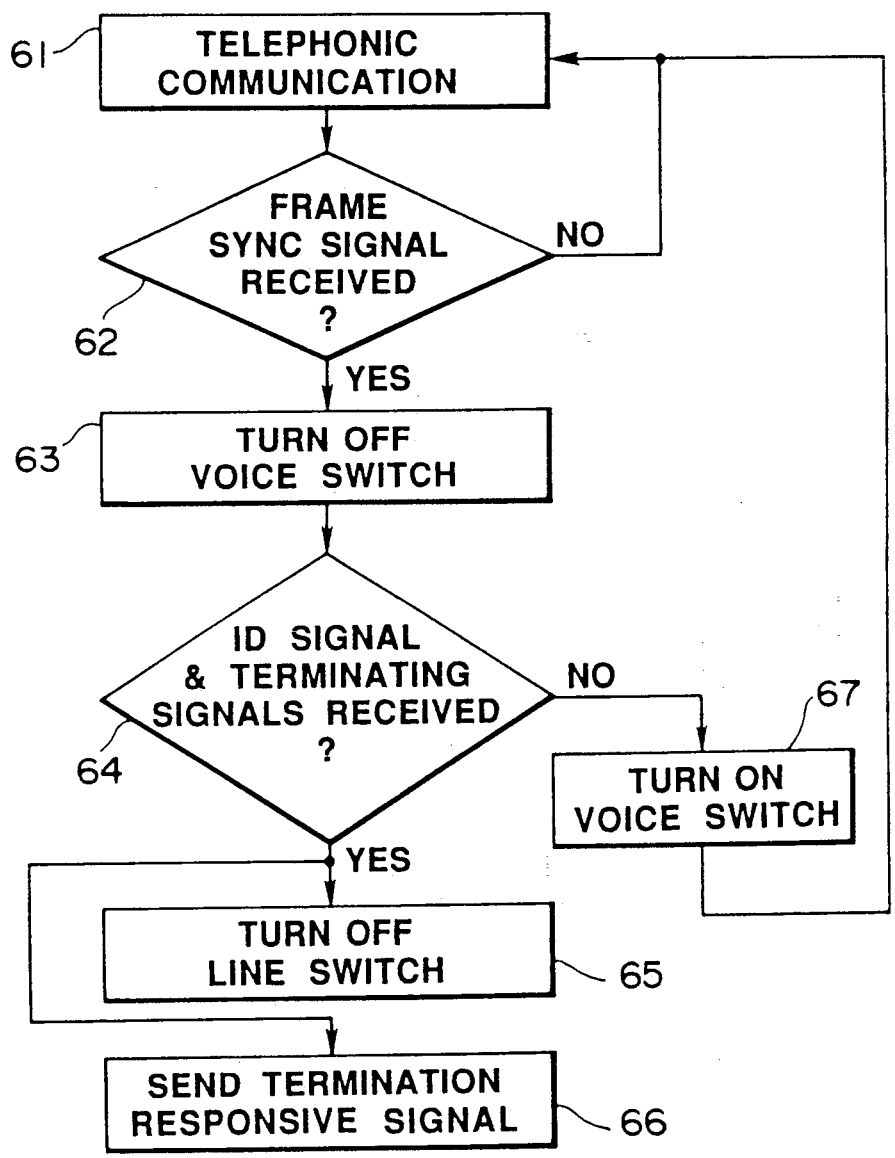
FIG. 5 is a flowchart illustrating the operation of the base unit at the speech termination.

The operations of the base unit 1 and radio telephone 2 when the speech terminating operation is performed will now be described with reference to the flowcharts of FIGS. 5 and 6.

Figure 2:
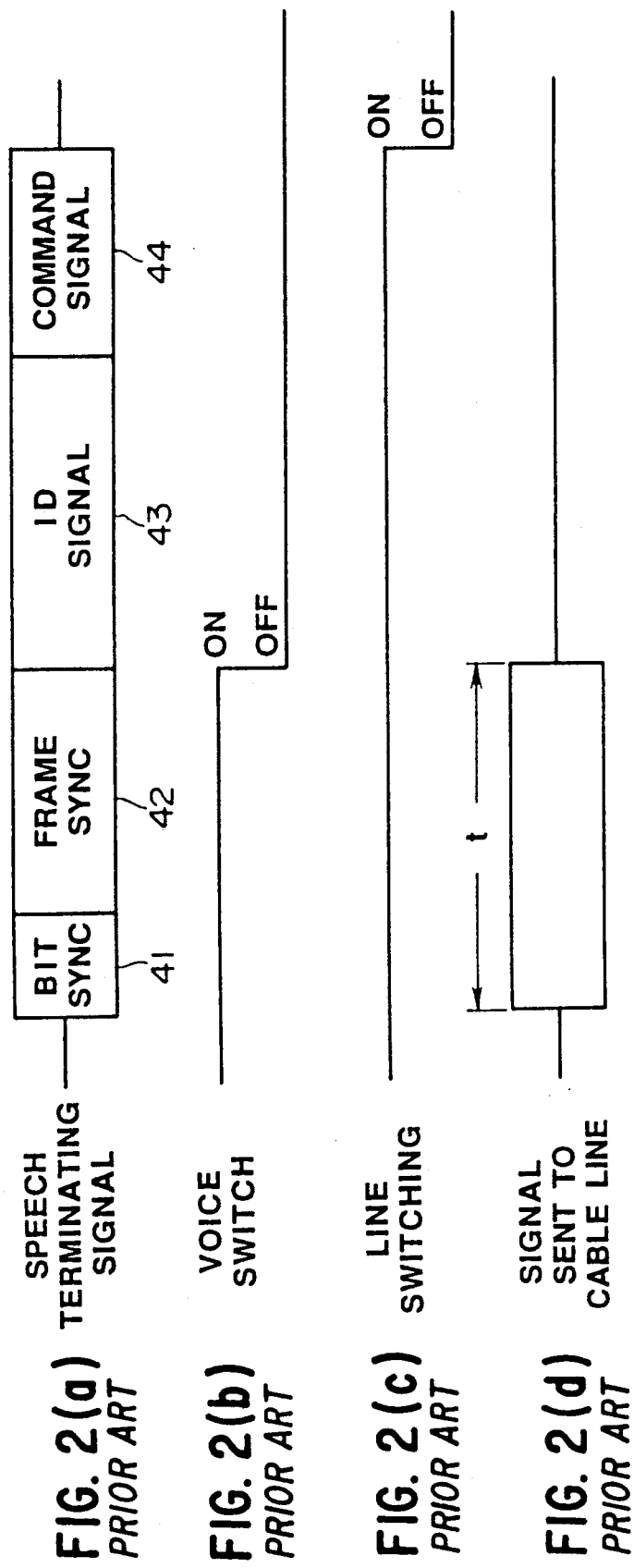
FIGS. 2(a) to 2(i) are a timing chart illustrating the operation of a conventional base unit performed when a speech is terminated.

The operation of the base unit 1 will be described with reference to FIG. 5. When the base unit 1 is in speech communication (step 61) and receives from the radio telephone 2 a speech terminating signal of a signal format shown in FIG. 2(a), it turns off the voice switch 11 when it detects a frame synchronizing signal contained in the speech terminating signal (steps 62, 63). The base unit determines whether either the ID code coincides with that allocated thereto or the control command is a speech terminating command (step 64). If the ID code coincides with that allocated to the base unit and the control command is the speech terminating command, the base unit turns off the line switch 4 and transmits a speech termination responsive signal to the radio telephone 2 (steps 65 and 66). If either the ID code does not coincides with that allocated to the base unit, or the control command is not the speech terminating command, the base unit turns on the reception voice switch 11 to return the same to the connection with the cable telephone line 3 (step 67).

Figure 6:
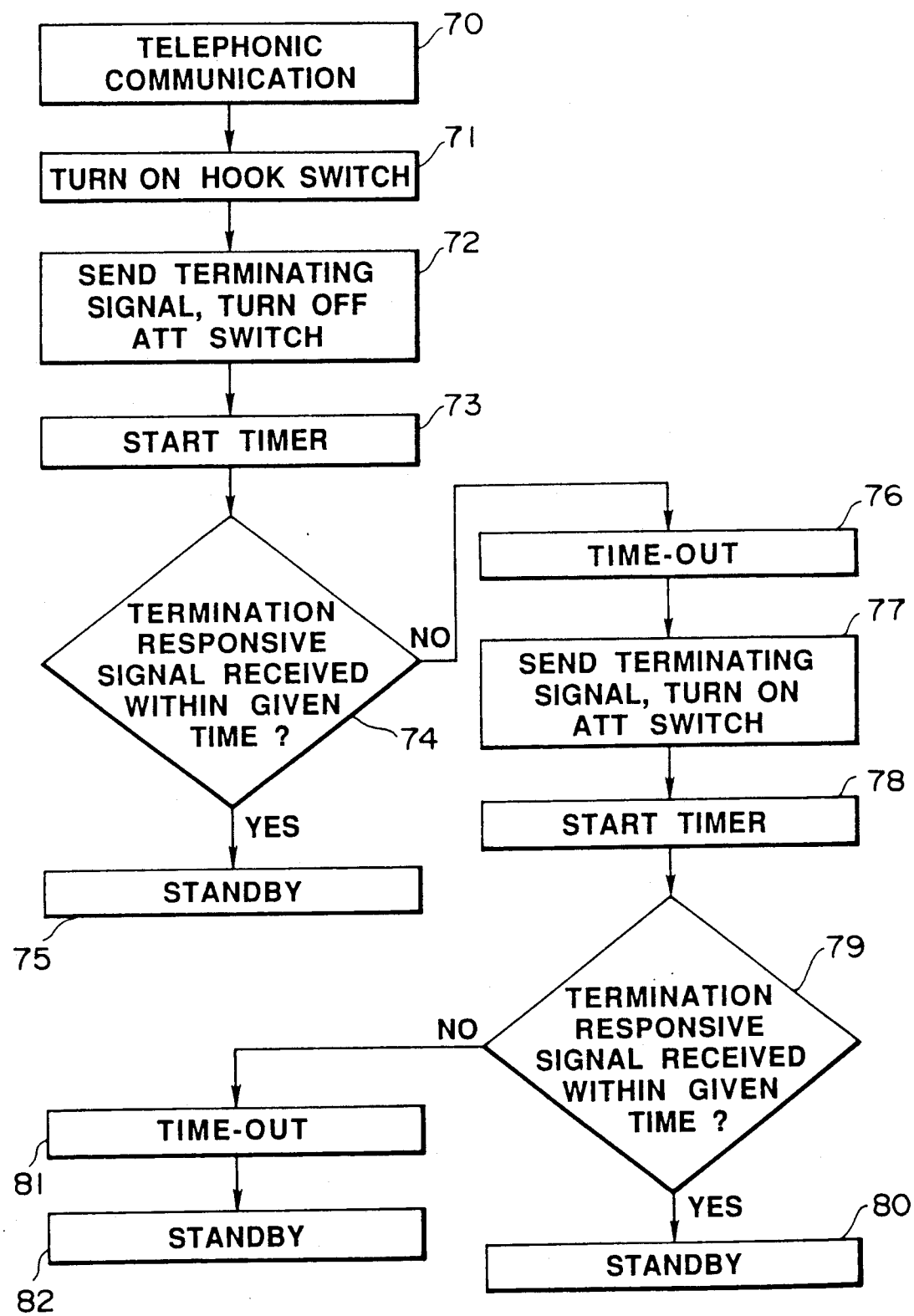
FIG. 6 is a flowchart illustrating the operation of a radio telephone performed in the speech termination.

In the flowchart of FIG. 6, when the radio telephone 2 is in telephonic communication (step 70) and the hook switch 28 goes on-hook (step 71), the control circuit 27 of the radio telephone 2 outputs a speech terminating signal to the variable attenuating circuit 50 to turn off its switch 53 (step 72). Thus, the speech terminating signal output from the control circuit 27 is attenuated with a degree of attenuation larger than normal via the attenuating circuit 50 and applied to a modulating input of the transmitter 22. Thus, the speech terminating signal is modulated at a level smaller than normal and transmitted toward the base unit 2. Thereafter, a timer to monitor the arrival of the speech termination responsive signal is started (step 73). If the speech termination responsive signal arrives from the base unit 1 before the timer takes a time-out (step 74), the control circuit 27 returns the radio telephone 2 to its standby state (step 75).

However, if the radio telephone receives no speech termination responsive signal before the time-out, it stops the transmission of the speech terminating signal temporarily and turns on the switch 53 of the attenuating circuit 50 (steps 76-77). The timer for monitoring the arrival of the speech termination responsive signal is restarted (step 78). If the speech termination responsive signal is received within the preset timer time, the radio telephone 2 is returned to its standby state (steps 79, 80). If the radio telephone receives no speech termination responsive signal even after the time-out, the radio telephone is returned compulsively to its standby state (steps 81, 82).

In summary, when the radio telephone 2 terminates its speech, it transmits a speech terminating signal at a first signal level smaller than normal at a first time. If the speech terminating signal at the first signal level is received by the base unit 1 and the speech termination responsive signal is received, no second speech terminating signal is transmitted and the radio telephone returns to its standby state. If no speech terminating signal at the first signal level is received by the base unit because, for example, the distance between the radio telephone 2 and the base unit 1 is large, the radio telephone transmits a speech terminating signal at a second signal level larger than the first signal level and returns to its standby state when it receives a corresponding responsive signal. Therefore, if speech termination is achieved with the first speech terminating signal, the level of the speech terminating signal leaking possibly to the cable telephone line 3 is small and an uncomfortable feeling given to the addressee is eliminated because the level of the leaking signal is reduced compared to the normal level.

As mentioned above, by using different first and second levels of the speech terminating signal, reducing the level of the control signal leaking possibly to the cable telephone line 3 and ensuring the speech termination are both achieved simultaneously.

In this case, if the reception field strength from the base unit 2 is known beforehand, the number of times of transmission of the speech terminating signal can be reduced to one (unity) by increasing the of the speech terminating signal only when the reception field strength is low.

This concept is applicable similarly to the transmission of the holding signal and not limited to the transmission of the speech terminating signal. The level of the control signal sent to the cable telephone line 3 can be reduced until a melody sound for holding purposes is sent to thereby eliminate an uncomfortable feeling given to the addressee.

Figure 7:
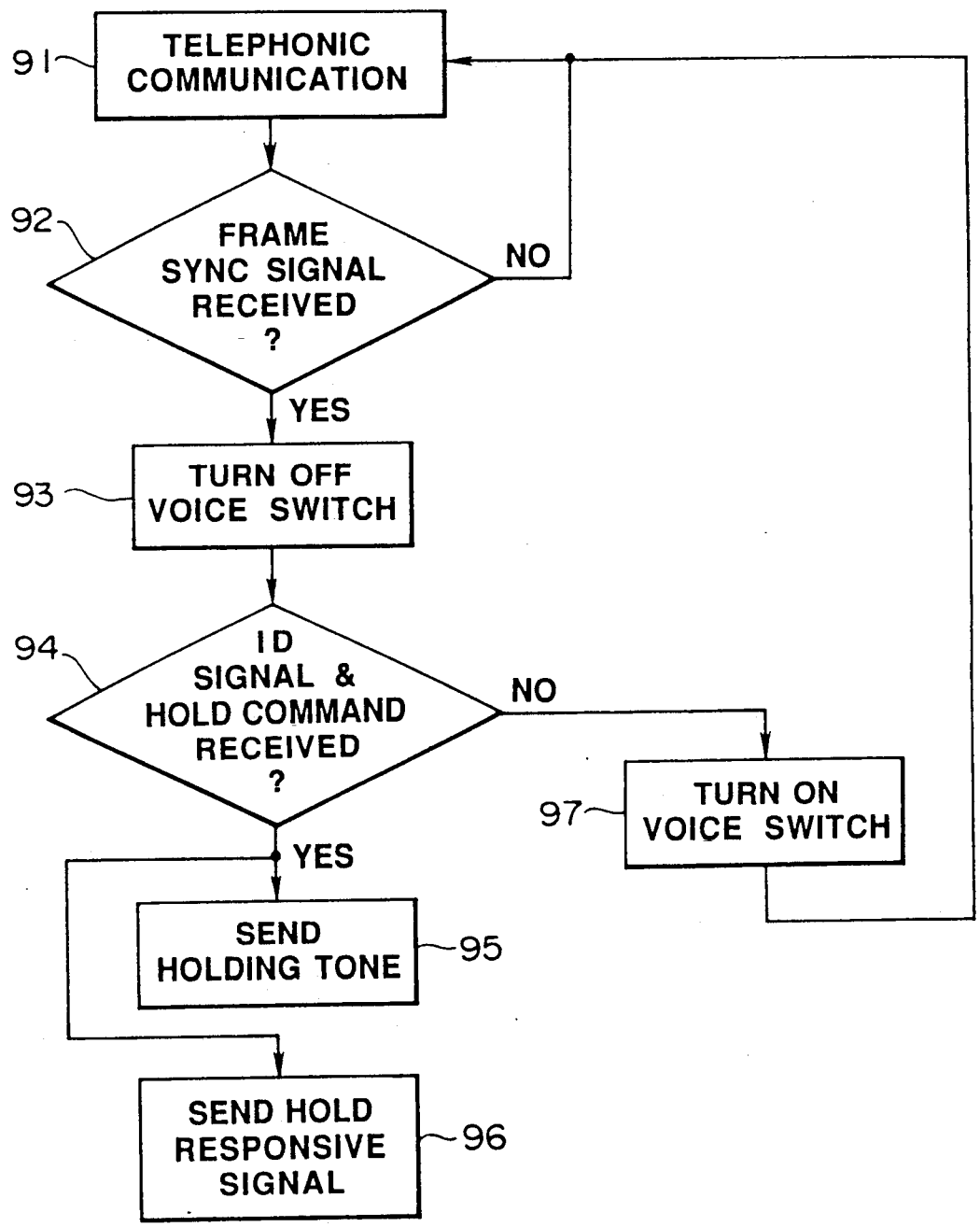
FIG. 7 is a flowchart illustrating the operation of the base unit performed in the holding operation.
Figure 8:
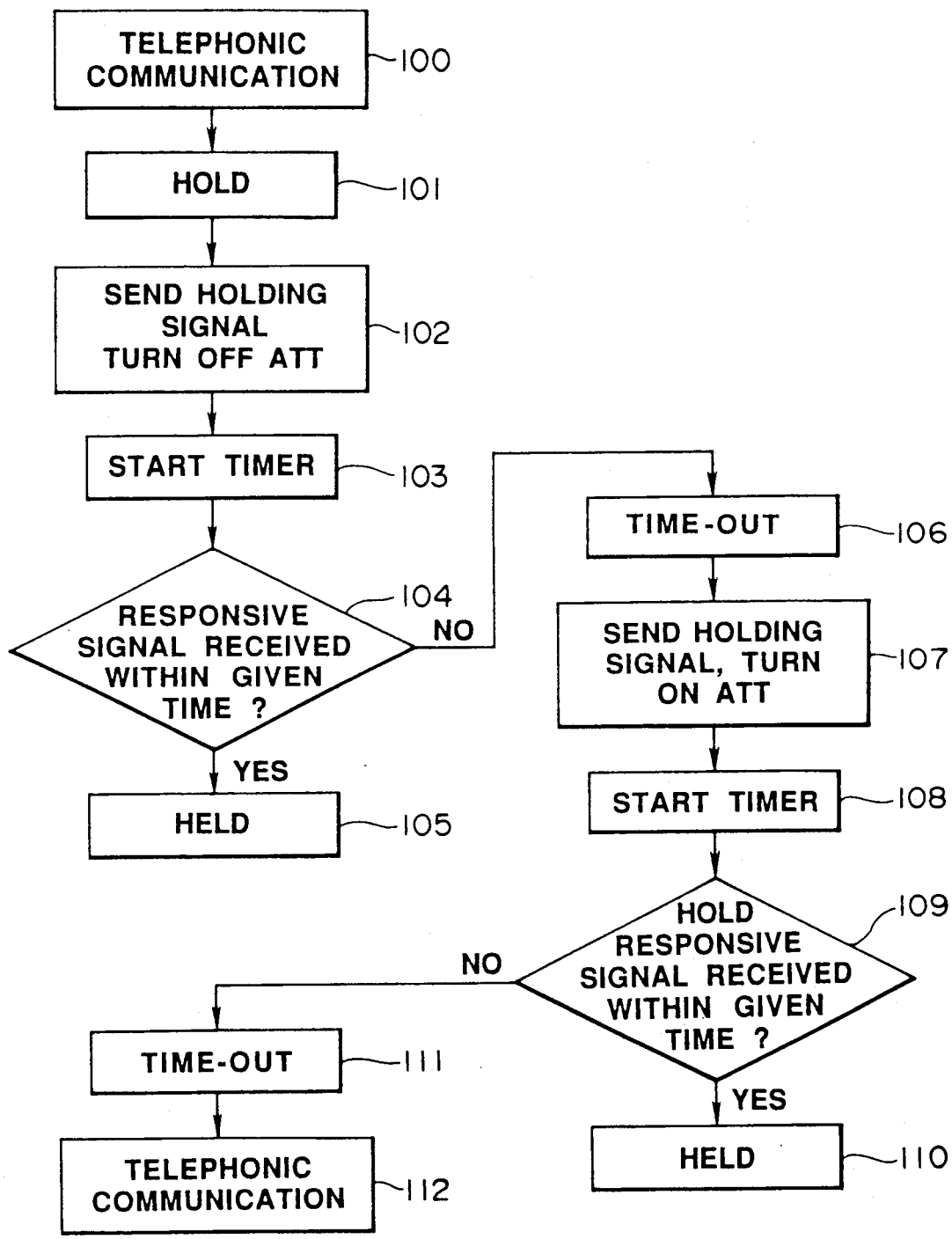
FIG. 8 is a flowchart illustrating the operation of the radio telephone performed in the holding operation.

FIGS. 7 and 8 are flowcharts illustrating the respective operations of the base unit 1 and the radio telephone 2 performed in the holding operation. The operation of the base unit 1 will be described with reference to FIG. 7. When the base unit 1 in a speech state (step 91) receives a holding signal from the radio telephone 2, and detects a frame synchronizing signal contained in the holding signal, it turns off the voice switch 11 (steps 92, 93). The holding signal has the same format as the signal shown in FIG. 2(a). The base unit determines whether the ID code coincides with that allocated thereto or whether the control command is a holding command (step 94). If so, the base unit starts the holding circuit 15 to thereby cause same to start and send a holding sound (melody sound) to the cable telephone line 3 and to transmit a hold responsive signal to the radio telephone 2 (steps 95, 96). If the ID code does not coincide with that of the base unit or if the control command is not a speech terminating command signal, the base unit 1 turns on the reception voice switch 11 and returns to its state where it is connected with the cable telephone line 3 (step 97).

In the flowchart of FIG. 8, if the control circuit 27 of the radio telephone 2 is in a speech state (step 200) and is subjected to the holding operation caused by (the pressing of the holding button 29a at the key pad unit 29 (step 101), it outputs a holding signal to the attenuating circuit 50 and turns off its switch 53 (step 102). Thus the holding signal output from the control circuit 27 is attenuated with a degree of attenuation larger than normal via the attenuating circuit 50 and applied to the modulating input of the transmitter 22. Thus, the holding signal is levels smaller than normal and transmitted toward the base unit 2. Thereafter, a timer (not shown) to monitor the arrival of the hold responsive signal is started (step 103). If the hold responsive signal arrives from the base unit 1 before the timer's times-out (step 104), the control circuit 27 puts the radio telephone 2 (step 105) in a hold state.

However, if the hold responsive signal is not received by the time-out, it stops the transmission of the holding signal temporarily and turns on the switch 53 of the attenuating circuit 50 (steps 106, 107). The timer to monitor the arrival of the hold responsive signal is restarted (step 108). If the hold responsive signal is received within the set timer time, the radio telephone 2 is put into a hold state (steps 109, 110). However, if no hold responsive signal is received after the time-out, the radio telephone shifts to a speech state by regarding the hold responsive signal as being not received (steps 111, 112).

As just described above, by using the first and second different levels of the speech hold signal, the level of the control signal leaking possibly to the cable telephone line 3 is reduced to thereby ensure the hold of the radio telephone.

What is claimed is:

1. A radio telephone system, comprising:
   a base unit connected to a cable telephone line;
   a radio telephone connected with the base unit via a radio circuit;
   means for transmitting a control signal via the radio circuit from the radio telephone to the base unit;
   means for transmitting a voice signal via the radio circuit from the radio telephone to the base unit;
   voice switching means for sending therethrough the voice signal received from the radio telephone to the cable telephone line; and
   signal level changing means for decreasing the level of the control signal sent by the control signal transmitting means when the control signal designates the turning off of the voice switching means.

2. A radio telephone system according to claim 1, wherein the control signal designating the turning off of the voice switching means is a speech terminating signal designating termination of speech between the base unit and the radio telephone.

3. A radio telephone system according to claim 1, wherein the control signal designating the turning off of the voice switching means is a holding signal designating the holding of the cable telephone line.

4. A radio telephone system according to claim 1, wherein the signal level changing means includes a variable attenuating circuit for attenuating the level of a modulating signal input to the control signal transmitting means.

5. A radio telephone system according to claim 4, wherein the attenuating circuit comprises:
   a first attenuator;
   a second attenuator connected in series with the first attenuator; and
   a switch for shorting the first attenuator whereby the level of the modulating signal is attenuated by turning off the switch.

6. A radio telephone system, comprising:
   a base unit connected to a cable telephone line;
   a radio telephone connected with the base unit via a radio circuit;
   means for transmitting a control signal via the radio circuit from the radio telephone to the base unit;
   means for transmitting a voice signal via the radio circuit from the radio telephone to the base unit;
   voice switching means for sending therethrough the voice signal received from the radio telephone to the cable telephone line;
   signal level changing means for decreasing the level of the control signal sent by the control signal transmitting means when the control signal designates the turning off of the voice switching means; and
   means for increasing the level of the control signal and retransmitting the resulting control signal when the control signal is not received by the base unit.

7. A radio telephone system according to claim 6, wherein the control signal designating the turning off of the voice switching means is a speech terminating signal designating termination of speech between the base unit and the radio telephone.

8. A radio telephone system according to claim 6, wherein the control signal designating the turning off of the voice switching means is a holding signal designating the holding of the cable telephone line.

9. A radio telephone system according to claim 6, wherein the signal level changing means includes a variable attenuating circuit for controlling the degree of attenuation of the level of a modulating signal input to the control signal transmitting means.

10. A radio telephone system according to claim 9, wherein the attenuating circuit comprises:
    a first attenuator;
    a second attenuator connected in series with the first attenuator; and
    a switch for shorting the first attenuator whereby the degree of attenuation of the modulating signal is controlled by turning on and off the switch.

11. A radio telephone system, comprising:
    a base unit connected to a cable telephone line;
    a radio telephone line connected via a radio circuit to the base unit;
    control signal transmitting means for transmitting a control signal with a first signal level via the radio circuit from the radio telephone to the base unit, and for transmitting the control signal with a second signal level larger than the first signal level when the control signal transmitted with the first signal level cannot be received by the base unit.

12. A radio telephone system according to claim 11, wherein the control signal is a control signal designating the turning off of the voice switching means for transmitting to the cable telephone line the voice signal received from the radio telephone.

13. A radio telephone system according to claim 12, wherein the control signal includes a speech terminating signal designating speech termination.

14. A radio telephone system according to claim 12, wherein the control signal is a holding signal designating the holding of the cable telephone line.

15. A method of controlling a radio telephone system having a base unit connected to a cable telephone line, a radio telephone connected via a radio circuit to the base unit, and means for transmitting a control signal to designate the turning off of a voice switching means for transmitting to the cable telephone line a voice signal received from the radio telephone, the method comprising the steps of:

transmitting the control signal with a first signal level from the radio telephone to the base unit; and transmitting the control signal with a second signal level larger than the first signal level from the radio telephone to the base unit when the control signal transmitted with the first signal level cannot be received by the base unit.

16. The method according to claim 15, wherein the control signal designating the turning off of the voice switching means is a speech terminating signal designating termination of speech between the base unit and the radio telephone.

17. The method according to claim 15, wherein the control signal designating the turning off of the voice switching means is a holding signal designating the holding of the cable telephone line.

* * * * *